Patented Dec. 19, 1944

2,365,253

UNITED STATES PATENT OFFICE 2,365,253

METHOD OF TESTING MATERIALS

Taber de Forest, Chicago, Ill., and Alfred V. de Forest, Marlboro, N. H., assignors to Magnaflux Corporation, Chicago, Ill., a corporation of Delaware No Drawing. Application December 31, 1941, Serial No. 425,238

11 Claims. (Cl. 175—183)

This invention relates to methods and compositions for locating and evaluating, by magnetic means, cracks, flaws, discontinuities or the presence of inhomogeneities of any kind in or near the surface regions of bodies composed of steel, iron or other metals.

It is well known that if a body of magnetizable material is subjected to the action of a magnetizing force, lines of magnetic flux are set up in such a body. The paths taken by such lines of flux are in large part determined both by the degree of continuity and the homogeneity of the body. If such a body is subjected to the action of a magnetizing field and brought into contact with finely divided particles of magnetizable material, these particles are attracted by and cling to the surface of the body at regions of the latter where discontinuities or other defects exist, by reason of the magnetic polar effects exhibited at said regions by the body, with consequent generation of leakage lines of flux.

The fine magnetizable particles may be brought into contact with the body being tested by being sprinkled thereon. In another method of application the particles are held in suspension in a liquid medium such as oil, the magnetized body being immersed therein. The fluid medium tends to render the fine particles highly mobile and therefore the more free to orient themselves for ready grouping in the vicinity of leakage lines of flux from the body being tested.

Such methods are not limited to the examination of bodies formed of paramagnetic material but are also applicable to the testing of nonmagnetic bodies. Irregularities, for instance, in a brass bar may be detected by causing the bar to be traversed by an electric current. If finely divided magnetic material is thus brought into contact with the surface of the bar it will form lines at right angles to the direction of electrical flow, in regions where the bar is uniform in structure, i. e., where no irregularities exist. If, however, there exist irregularities in any localities, there will be changes in the direction of current flow as well as changes in current density at these localities. The paramagnetic particles will tend to arrange themselves, at those localities, in patterns significant of such changes in density and direction of current flow.

In many cases there is no very great color contrast between the surface of the article being tested and the paramagnetic particles formed of iron, black oxide of iron or equivalent material whose arrangement reveals the existence and location of otherwise hidden defects in the article being tested, so that careful visual inspection is required after testing to find the patterns of paramagnetic material produced by the magnetic testing methods referred to hereinabove. This is particularly the case for articles having dark surfaces, for instance, articles subjected to a Parkerizing treatment.

We have found that if there is incorporated with the paramagnetic particles used for testing a material that will bleed in a suitable liquid medium, then moistening of the article with such a medium after the above outlined testing has been carried out will cause bleeding from paramagnetic particles adhering to the article where the article is defective so that the location of adherent paramagnetic particles will be clearly revealed. The paramagnetic particles may be coated, for instance, with potassium permanganate or water soluble dyes such as Methyl Violet. Moistening with water after testing will cause characteristic bleeding of a violet color from adherent paramagnetic particles thus coated, whose location and grouping will at once be apparent even on cursory visual inspection. If the bleeding dye is fluorescent under suitable excitation, the presence of paramagnetic particles on dark surfaces can be made strikingly evident by illumination with ultraviolet light or the like.

It is therefore an important object of the present invention to provide an improved method of magnetically testing metallic articles by means of finely divided paramagnetic particles such that the location of adherent paramagnetic particles revealing hidden defects will be clearly apparent after testing has been completed.

Another important object of the present invention is to provide finely divided paramagnetic particles suitable for use in magnetic testing of metallic articles having associated therewith compositions capable of bleeding when treated with a suitable liquid medium, whereby treatment with such a medium after magnetic testing will reveal the location and arrangement of adherent paramagnetic particles.

Other and further objects and features of the invention will become apparent from the following description and appended claims.

The nature of the material capable of bleeding to be associated with the paramagnetic particles used for testing will be governed by the method of applying the paramagnetic particles to the article when testing. If the particles are simply sprinkled on the article being tested, then no limitation is imposed on the nature of the potentially bleeding material, which may be soluble in any liquid medium such as oil, water or alcohol, for the reason that there is no exposure of the paramagnetic particles to any liquid medium prior to the completion of the magnetic testing.

However, when the paramagnetic particles are suspended in a liquid medium for application to the article being tested, then the potentially bleeding material to be associated with the paramagnetic particles should be selected from such compositions as do not bleed in the liquid suspending medium. Bleeding should not occur before application of what is hereinafter referred to as a developing medium to the article after completion of magnetic testing. When the suspending medium and the developing medium are immiscible, as in the case of oil and water, it is sometimes necessary to remove a film of suspending medium still adhering to the article after completion of magnetic testing, before application of the developing medium, by means of an intermediate application of a third appropriate liquid medium hereinafter referred to as a conditioning medium. The oil film referred to hereinabove may be removed, for instance, by immersion in carbon tetrachloride and subsequent drying. Where such a conditioning medium is applied before the developing medium, the potentially bleeding composition attached to the paramagnetic particles should not be soluble in the conditioning medium.

In the case where paramagnetic particles are applied in dry form to the article being tested, as by sprinkling, dusting or sifting, many finely divided compositions capable of bleeding or effecting characteristically colored stains in various liquid media may be employed. To have the potentially bleeding composition attached or adherent to the paramagnetic particles it is preferable to employ a binding medium such as nitrocellulose or cellulose acetate solutions, solutions of various resins in alcohols, hydrocarbons or other organic solvents, gum solutions, silicate solutions, glue solutions, or other adhesive or equivalent compositions capable of attaching particles of potentially bleeding material to the paramagnetic particles. The binding medium should be selected with some regard to the nature of the potentially bleeding composition being used and the nature of the developing medium to be applied. It may be undesirable, for instance, to employ a binding medium wherein the potentially bleeding material is extremely soluble. In the case of Methyl Violet, which is quite soluble in water and alcohol but not in hydrocarbons, a solution of rosin in naphtha may be used as a binding medium.

When paramagnetic particles are applied to the article being tested as a suspension in a liquid medium, dyes should be used that do not bleed in the suspension medium. If a hydrocarbon is used as a suspending medium, as is conventionally done, then the dyes attached to the paramagnetic particles should not be soluble in such a medium, nor should the binding medium be susceptible to attack by such medium by dissolution or otherwise. If water is to be used as a developing medium then dyes such as Methyl Violet, Quinoline Yellow, Methylene Blue, Soluble Blue, Rhodamine, Eosine and the like may be employed. A conditioning medium such as carbon tetrachloride, methylene dichloride or dichlor ethylene may be used to wash off any oily hydrocarbon film adhering to the article after magnetic testing has been completed.

When an organic liquid such as diacetone alcohol is used as a developing medium, there is usually no need for any conditioning medium to remove a film of hydrocarbon suspending medium, since most organic liquids will dissolve oil and hydrocarbon films. Excepted from this rule are those organic liquids that have appreciable amounts of water admixed therewith, for such a water content will, if sufficiently large, render the organic liquid a non-solvent for oils and hydrocarbons. Hence, when an organic liquid other than a hydrocarbon is used as a developing medium, a great number of dyes soluble in such media may be employed. Examples are Fuchsine, Malachite Green and other triphenyl methane dyestuffs, acid and basic phthalein dyestuffs, various azo dyestuffs insoluble in hydrocarbons, and many others. For such dyes a solution of a suitable resin in a hydrocarbon solvent or even a solution of nitrocellulose in esters or the like may be employed as a binding medium.

When the paramagnetic particles are applied to the article being tested in water suspension, and, for instance, a hydrocarbon oil developing medium is to be used, fat soluble dyes on the order of Oil Yellow, Oil Orange E, Quinoline Yellow Spirit Soluble, Sudan II, Sudan CB, Sudan G, Cyanosine Spirit Soluble, the fatty acid compounds of the bases of the triphenyl methane dyestuffs, and other dyes conventionally used to color oils can be attached to the paramagnetic particles by binding media such as solutions of nitrocellulose or cellulose acetate in esters such as ethyl acetate or the like. Mere drying will suffice to remove adherent water before application of the oily developing medium, or conditioning media such as methyl alcohol may be applied in the cases where no bleeding will be effected by such conditioning media. If the attached dye is insoluble in water, but soluble in methyl alcohol, the latter liquid will, of course, serve as a developing medium, rendering unnecessary the use of any special oily developing medium.

Selection of a dye for any particular testing purpose may be made from the extensive descriptive lists of dyestuffs to be found in the published literature. Particular reference is made to the "Colour Index" published by the Society of Dyers and Colourists and to Schulz' "Farbstofftabellen."

When, for instance, any indicated defect is to be considered a reason for rejection, then a dye that runs rapidly on development to extend over a large area is desired, while, on the other hand, if the shape and size of the indicated defect are important, a very slowly running dye is preferable. The extent of bleeding or running can also be controlled by selecting a developing bath having an appropriate solvent power. The solvent power, for instance, of wood alcohol for Methyl Violet may be lessened by the addition of toluene, naphtha or other hydrocarbons. Bleeding may also be limited locally by dispersion in the developing media of colloidally soluble matter. In the case, say, of diacetone alcohol, sufficient nitrocellulose may be incorporated to effect the desired localization of bleeding. To aqueous developing media may be added gelatin, agar-agar, or a pectin-sugar mixture, which render the developing media viscous and limit spreading of dissolved coloring matter.

The amount and nature of the binding medium further effect the extent of bleeding. If the binding medium contains a large amount of total solids, the dyestuff particles attached to the paramagnetic particles will be more or less completely enveloped by relatively thick films of solid material which protect the dyestuff against solution by the developing medium. The composition of the binding medium is also significant in relation to the nature of the developing medium. If a solution of a coumar resin is used as a binding medium, bleeding will be limited when methyl alcohol is used as a developing medium, for methyl alcohol will not dissolve coumar resins. If, on the other hand, a hydrocarbon developing medium is applied, which will dissolve the coumar binding medium, then bleeding will be extensive. In the case of nitrocellulose binding media, alcohols will not dissolve the nitrocellulose, and, if used as developing media, will effect relatively limited bleeding, while solvents for nitrocellulose such as esters and ketones will effect widespread bleeding.

An illustrative example of the working of the present invention is described hereinbelow:

A few per cent (by weight) of Rhodamine is added to paramagnetic black oxide of iron and to the mixture is added about one third (by volume) of a solution of nitrocellulose in ethyl acetate. The resulting mass is mixed thoroughly to form a paste. Before this pasty mass has been completely dried a few drops of oleic acid or stearic acid or a small amount of a metallic stearate are added, to serve as dispersing agents in the subsequent suspension of the paramagnetic articles in a liquid hydrocarbon medium. The resulting mass is dispersed in a light hydrocarbon oil such as the No. 9 light petroleum oil sold by the Standard Oil Company of Indiana. If necessary, the mixture may be reground. The final mixture may be added to additional light petroleum oil to form a suspension suitable for magnetic testing purposes. After magnetic testing has been completed, the dye may be developed by the application of diacetone alcohol, or, after removal of any adherent oil film by carbon tetrachloride, by the application of water. The diacetone alcohol may be thickened by incorporation of nitrocellulose, while the water may be thickened by incorporation of gelatine, agar-agar or a sugar-pectin mixture, to localize bleeding. In any case, the location of adherent paramagnetic particles on the article being tested is clearly revealed by the bleeding of the Rhodamine attached to the adherent paramagnetic particles.

In the case of fluorescent dyes, illumination by suitable light such as ultraviolet light will cause the dyes to fluoresce brilliantly, whereby the location of adherent paramagnetic particles is clearly revealed. A mercury-vapor lamp may be employed in conjunction with a fluorescent filter in the form of a glass which absorbes most of the visible light, to give a very strong fluorescent effect contrasting strikingly with the dark background of the metal surface.

If permanent records of tests carried out with developing media are desired, paper may be pressed against the article that has been tested, the bleeding dye being transferred to the paper to stain the paper surface. Such a stained paper will form a permanent record of the test, and may also be used for inspection in place of a direct inspection of the tested article.

It should be noted that the developing media may be applied as a spray or as a vapor. An article that has been subjected to magnetic tests may be exposed to steam to develop a water soluble dye or to alcohol or hydrocarbon vapors to develop dyes soluble in these materials.

Certain dyestuffs have adhesive properties in relation to black oxide of iron, iron particles and other paramagnetic particles, and can therefore serve as binding media for themselves. Methyl Violet, for instance, may be admixed in alcohol solution with black oxide and will adhere thereto after evaporation of the alcohol.

The present invention pertains generally to methods of magnetic testing by means of paramagnetic particles that are caused to adhere to defective areas of articles being tested and provides paramagnetic powder or finely divided material having incorporated therewith coloring matter that will serve to reveal paramagnetic matter adhering to the articles after magnetic testing either by bleeding on application of suitable media or by fluorescence under suitable illumination. More particularly, the coloring matter, which may be inorganic (potassium permanganate or the like) or organic (dyestuffs), is associated with the individual paramagnetic particles so as to follow the latter and to be held by the latter wherever the paramagnetic particles adhere to an article being tested. One method of effecting such association employes a binding, adhesive or cementing medium. The invention further provides methods for revealing the location of adherent paramagnetic particles by the application of liquid media (which may be applied in vapor form to be liquefied on the article being tested) effecting bleeding from particles of coloring matter attached to adherent paramagnetic particles.

Many details of procedure and composition may be varied within a wide range without departing from the principles of this invention, and it is therefore not our purpose to limit the patent granted on this invention otherwise than necessitated by the scope of the appended claims.

We claim as our invention:

1. The method of detecting defects in a metallic object which includes subjecting the object to the action of a magnetic field, applying to the object paramagnetic particles having attached thereto a coloring matter soluble in a liquid medium, and then applying to said object sufficient amounts of said liquid medium to effect bleeding of said coloring matter, whereby the location of adherent paramagnetic particles on said object is revealed.

2. The method of detecting defects in a metallic object which includes subjecting the object to the action of a magnetic field, applying to the object paramagnetic particles having attached thereto a water soluble dye, and then applying to said object sufficient amounts of water to effect bleeding of said coloring matter, whereby the location of adherent paramagnetic particles on said object is revealed.

3. The method of detecting defects in a metallic object which includes subjecting the object to the action of a magnetic field, applying to the object paramagnetic particles having attached thereto a dye soluble in an organic liquid, and then applying to said object sufficient amounts of said organic liquid to effect bleeding of said coloring matter, whereby the location of adherent paramagnetic particles on said object is revealed.

4. The method of detecting defects in a metallic object which includes subjecting the object to the action of a magnetic field, immersing the object in a suspension in a liquid medium of paramagnetic particles having cemented thereto a coloring matter insoluble in said liquid medium but soluble in another liquid medium, removing the object from the liquid medium in which the object was immersed, and applying to the object a sufficient amount of the liquid medium capable of dissolving the coloring matter to cause the coloring matter to bleed, whereby the location on said object of adherent paramagnetic particles is revealed.

5. The method of detecting defects in a metallic object which includes subjecting the object to the action of a magnetic field, immersing the object in a suspension in a liquid hydrocarbon of paramagnetic particles having cemented thereto a dyestuff insoluble in said liquid hydrocarbon but soluble in another liquid medium, removing the object from the liquid hydrocarbon, and applying to the object a sufficient amount of said liquid medium to cause the dyestuff to bleed, whereby the location on said object of adherent paramagnetic particles is revealed.

6. The method of detecting defects in a metallic object which includes subjecting the object to the action of a magnetic field, immersing the object in a suspension in a liquid hydrocarbon of paramagnetic particles having a water soluble dyestuff insoluble in said liquid hydrocarbon cemented thereto by a binding medium insoluble in said liquid hydrocarbon, removing the object from the liquid hydrocarbon, washing the object with a volatile solvent for said hydrocarbon that is a non-solvent for said dyestuff, to remove any hydrocarbon film adhering to said object after removal from the liquid hydrocarbon, drying the washed object, and applying to the dried object a sufficient amount of a liquid aqueous medium to cause said dyestuff to bleed, whereby the location of paramagnetic particles adhering to said object is revealed.

7. The method of detecting defects in a metallic object which includes subjecting the object to the action of a magnetic field, immersing the object in a suspension in a liquid hydrocarbon of paramagnetic particles having a water soluble dyestuff insoluble in said liquid hydrocarbon cemented thereto by a binding medium insoluble in said liquid hydrocarbon, removing the object from the liquid hydrocarbon, washing the object with a volatile solvent for said hydrocarbon that is a non-solvent for said dyestuff to remove any hydrocarbon film adhering to said object after removal from the liquid hydrocarbon, drying the washed object, and applying to the dried object a sufficient amount of a viscous liquid aqueous medium to cause said dyestuff to bleed, whereby the location of paramagnetic particles adhering to said object is revealed by bleeding of said dyestuff cemented to said adherent paramagnetic particles into said aqueous medium, said bleeding being localized due to the viscosity of said aqueous medium.

8. In a method of testing metallic objects comprising the step of causing paramagnetic particles to adhere to defective areas of said object, the improvement comprising prior to said adhesion effecting step bonding a dyestuff soluble in a liquid medium to said particles, and rendering the location of adherent paramagnetic particles apparent by applying to said object an amount of said liquid medium sufficient to cause the dyestuff bonded to said adherent paramagnetic particles to bleed.

9. In a method of testing metallic objects comprising the step of causing paramagnetic particles to adhere to defective areas of said object, the improvement comprising prior to said adhesion effecting step bonding to said paramagnetic particles a dyestuff soluble in a liquid medium and capable of fluorescing when subjected to irradiation, and rendering the location of adherent paramagnetic particles apparent by moistening said object with said liquid medium and irradiating said object.

10. In a method of testing metallic objects comprising the step of causing paramagnetic particles to adhere to defective areas of said object, the improvement comprising prior to said adhesion effecting step bonding to said particles a dyestuff soluble in a liquid medium and capable, when so dissolved, of staining a sheet of fibrous material, applying to an object being tested and having paramagnetic particles adherent to defective areas amounts of said liquid medium sufficient to moisten said dyestuff, and thereafter pressing a fibrous sheet against said object so as to stain said sheet wherever said sheet contacts adhering paramagnetic particles.

11. In a method of testing metallic objects comprising the step of causing paramagnetic particles to adhere to defective areas of said object, the improvement comprising prior to said adhesion effecting step bonding to said particles a dyestuff soluble in a liquid medium, and moistening said object with said liquid medium having dispersed therein a thickening agent, whereby bleeding into said medium from dyestuff bonded to adherent paramagnetic particles is localized.

TABER DE FOREST.
ALFRED V. DE FOREST.